(12) United States Patent
Asplund et al.

(10) Patent No.: US 9,088,999 B2
(45) Date of Patent: Jul. 21, 2015

(54) USING INFORMATION IN MULTIPLE SUB-BANDS TO ADAPTIVELY DETERMINE CQI

(75) Inventors: Henrik Asplund, Stockholm (SE); Peter Ökvist, Luleå (SE); Arne Simonsson, Gammelstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 291 days.

(21) Appl. No.: 13/574,161

(22) PCT Filed: Jan. 27, 2010

(86) PCT No.: PCT/SE2010/050071
§ 371 (c)(1),
(2), (4) Date: Jul. 19, 2012

(87) PCT Pub. No.: WO2011/093753
PCT Pub. Date: Aug. 4, 2011

(65) Prior Publication Data
US 2012/0300661 A1    Nov. 29, 2012

(51) Int. Cl.
| | |
|---|---|
| *H04L 12/28* | (2006.01) |
| *H04W 72/12* | (2009.01) |
| *H04L 1/20* | (2006.01) |
| *H04L 25/02* | (2006.01) |
| *H04L 1/00* | (2006.01) |
| *H04J 1/16* | (2006.01) |
| *H04W 28/04* | (2009.01) |

(52) U.S. Cl.
CPC ......... *H04W 72/1231* (2013.01); *H04L 1/0023* (2013.01); *H04L 1/0026* (2013.01); *H04L 1/20* (2013.01); *H04L 25/0226* (2013.01); *H04W 28/04* (2013.01)

(58) Field of Classification Search
USPC ................... 370/252, 329, 430, 478
See application file for complete search history.

(56) References Cited

U.S. PATENT DOCUMENTS

| | | | |
|---|---|---|---|
| 2006/0135193 A1 | 6/2006 | Ratasuk et al. | |
| 2008/0160917 A1 | 7/2008 | Dominique et al. | |
| 2009/0111475 A1 | 4/2009 | Yang et al. | |
| 2009/0116570 A1 | 5/2009 | Bala et al. | |
| 2011/0199921 A1* | 8/2011 | Damnjanovic et al. | ....... 370/252 |

FOREIGN PATENT DOCUMENTS

| | | |
|---|---|---|
| GB | 2454023 A | 4/2009 |
| WO | 2004/042982 A2 | 5/2004 |
| WO | 2008/041893 A1 | 4/2008 |

\* cited by examiner

*Primary Examiner* — John Pezzlo
(74) *Attorney, Agent, or Firm* — Murphy, Bilak & Homiller, PLLC

(57) ABSTRACT

The present solution relates to a method in a first communication node (201) for determining an indication of channel quality of a radio channel (205) between the first communication node (201) and a second communication node (203). The first communication node (201) and the second communication node (203) are comprised in a wireless communication network (200). The radio channel (205) comprises a plurality of sub bands. First, at least two channel quality reports are obtained (701) for different time instances. Each channel quality report comprises indications of channel quality of at least two of the plurality of sub bands. Then a channel quality deviation is estimated (702) for at least one of the plurality of sub bands. Further, an indication of a channel quality is determined (703) for at least one of the plurality of sub bands based on the estimated channel quality deviation.

23 Claims, 10 Drawing Sheets

USING INFORMATION IN MULTIPLE SUB-BANDS TO ADAPTIVELY DETERMINE CQI

TECHNICAL FIELD

This invention relates generally to a first communication node and a method in the first communication node, a second communication node and a method in the second communication node. More particularly this invention relates to determining an indication of channel quality of a radio channel between the first communication node and the second communication node.

BACKGROUND

In a typical cellular system, also referred to as a wireless communications network, wireless terminals communicate via a Radio Access Network (RAN) to one or more core networks. The wireless terminals may be mobile stations or user equipment units such as mobile telephones also known as "cellular" telephones, and laptops with wireless capability.

The radio access network covers a geographical area which is divided into cell areas, with each cell area being served by a base station, e.g., a Radio Base Station (RBS), which in some networks is also called Evolved Node B (eNB), NodeB or B node and which in this document also is referred to as a base station. A cell is a geographical area where radio coverage is provided by the radio base station equipment at a base station site. Each cell is identified by an identity within the local radio area, which is broadcast in the cell. A base station communicates over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The Third Generation Partnership Project (3GPP) has undertaken to evolve further the UTRAN and GSM based radio access network technologies. In 3GPP this work regarding the 3G Long Term Evolution (LTE) system is ongoing.

A Channel Quality Indicator (CQI) report describes the channel quality experienced in downlink by a user equipment, such as a user terminal. The downlink is the transmission path from the base station to the user equipment. The following CQI reporting description is for Long Term Evolution (LTE), but similar reporting procedure applies for Worldwide Interoperability for Microwave Access (WiMAX) as well.

A user equipment may be configured to send CQI reports to a base station either periodical, on Physical Uplink Control Channel (PUCCH), or scheduled, on Physical Uplink Shared Channel (PUSCH). The CQI for the last, i.e., most recent, reporting period may indicate forthcoming channel quality to a various degree of accuracy, but e.g. user position and user speed, altering the fast fading, as well as interference might change, causing the estimated CQI to be different from the correct one. This makes it clear that the estimated CQI has better short-term than long term accuracy, and that a long delay between measurement and CQI usage may reduce the accuracy when scheduling and selecting transmission format. A typical delay between measurement and application of CQI may be 10-15 ms. For example, the reporting delay may be 6 ms and the reporting interval may be in the order of 5 to 40 ms.

The user equipment bases the CQI reports on measurements of the gain to interference ratios on downlink reference signals. CQI reports are transmitted on uplink control channels to the scheduler situated in eNB. CQI reporting may be included in the Channel State Information (CSI) report. Depending on CSI report configuration, a CSI report may comprise a Pre-coding Matrix Indicator (PMI), a Rank Indicator (RI), one wideband CQI and sub band CQI offsets, in relation to the wideband CQI. A higher sub band CQI hence indicates a better sub band. There is also a user equipment selected best sub band CQI reporting where the user equipment only reports sub band CQI for best sub bands.

A scheduling algorithm, e.g. maximum Signal to Interference Ratio (Max-SIR), Proportional Fair (PF), etc., may utilize wideband or frequency selective scheduling (FSS) policies, hence use wideband or sub band CQI estimates.

Sub band CQI may also be used for more accurate transport format selection when scheduled on a fraction of the total available band. This can be the case in combination with FSS, but also for simpler scheduling algorithms such as round robin when there is a smaller amount of data to send which not requires the full bandwidth. This can be the case for example for voice over IP service which requires only one or two resource blocks per speech frame.

With frequency selective scheduling, it is possible to benefit from channel fading; since sub bands fade individually, the scheduler may select which sub band to use given their quality measure. But to make sure that the radio resource is efficiently utilized, it is important that proper sub bands are scheduled.

As a user equipment moves, the radio channel will be affected by the altering fast fading. For a given frequency, i.e. sub band, the channel will fade in the time domain and the fading speed is primarily dependent on the user equipment speed. If a specific point in time is considered, more or less similar occurrence may be seen, but in the frequency domain instead.

Due to the delays involved in the CQI reporting procedure, the sub band CQI to be used by e.g. the scheduler will be more or less outdated. The more outdated, the less representative will the CQI be, and hence, the corresponding performance using a non-representative CQI will likely be suboptimal. Having a too outdated CQI will be similar to have a random selection procedure; this is depicted in FIG. 1. FIG. 1 illustrates CQI distributions; an optimal selection procedure illustrated as a dashed line, where maximum CQI among all sub band per CQI reporting interval is selected without any delay, versus an approach where CQI is selected randomly among available sub bands, illustrated as a solid line.

US 2008/0057969 deals with optimization of CQI reporting time intervals. It describes a comparison of predicted CQI with real CQI to conclude if current reporting time interval is valid or not. Only the time evolution of the CQI values is considered.

US 2006/0270432 describes channel prediction using CQI and power control commands followed by scheduling. Again, only time evolution is considered.

SUMMARY

It is thus an object of the present invention to provide a mechanism that improves the throughput in a wireless communication network.

According to a first aspect of the present solution, the objective is achieved by a method in a first communication node for determining an indication of channel quality of a radio channel between the first communication node and a second communication node. The first communication node and the second communication node are comprised in a wireless communication network. The radio channel comprises a plurality of sub bands. One step in the method is to obtain at least two channel quality reports for different time instances from the second communication node. Each channel quality report comprises indications of channel quality of at least two of the plurality of sub bands. Then, a channel quality deviation is estimated for at least one of the plurality of sub bands based on the channel quality indicated in at least two of the most recent obtained channel quality reports and based on the obtained channel quality indications of at least two sub bands. Based on the estimated channel quality deviation for the at least one of the plurality of sub bands, an indication of a channel quality for at least one of the plurality of sub bands is determined.

According to a second aspect of the present solution, the objective is achieved by a first communication node for determining an indication of channel quality of a radio channel between the first communication node and the second communication node. The first communication node and the second communication node are comprised in a wireless communication network. The radio channel comprises a plurality of sub bands. The first communication node comprises an obtaining unit configured to obtain at least two channel quality reports for different time instances from the second communication node. Each channel quality report comprises indications of channel quality of at least two of the plurality of sub bands. The first communication node further comprises an estimator configured to estimate a channel quality deviation for at least one of the plurality of sub bands based on the channel quality indicated in at least two of the most recent obtained channel quality reports and based on the obtained channel quality indications of at least two sub bands. The first communication node also comprises a determining unit configured to determine an indication of channel quality for at least one of the plurality of sub bands based on the estimated channel quality deviation for at least one of the plurality of sub bands.

According to a third aspect of the present solution, the objective is achieved by a method in a second communication node for determining an indication of channel quality of a radio channel between a first communication node and the second communication node. The first communication node and the second communication node are comprised in a wireless communication network. The radio channel comprises a plurality of sub bands. At least two channel quality reports are obtained for different time instances. Each channel quality report comprises indications of channel quality of at least two of the plurality of sub bands. Then a channel quality deviation is estimated for at least one of the plurality of sub bands based on the channel quality indicated in at least two of the most recent obtained channel quality reports and based on the obtained channel quality indications of at least two sub bands. The estimated channel quality deviation is transmitted to the first communication node.

According to a fourth aspect of the present solution, the objective is achieved by a second communication node for determining an indication of channel quality of a radio channel between a first communication node and the second communication node. The first communication node and the second communication node are comprised in a wireless communication network. The radio channel comprises a plurality of sub bands. The second communication node comprises an obtaining unit which is configured to obtain at least two channel quality reports for different time instances. Each channel quality report comprises indications of channel quality of at least two of the plurality of sub bands. The second communication node also comprises an estimator configured to estimate a channel quality deviation for at least one of the plurality of sub bands based on the channel quality indicated in at least two of the most recent obtained channel quality reports and based on the obtained channel quality indications of at least two sub bands. The second communication node further comprises a transmitting unit which is configured to transmit the estimated channel quality deviation to the first communication node.

Thanks to the possibility to utilize CQI for other, neighbouring, sub bands when predicting the channel for a particular sub band, the throughput in a wireless communication network is improved when performing scheduling or link adaptation.

The present technology affords many advantages, for which a non-exhaustive list of examples follows:

The proposed solution provides a method that can provide a frequency selective scheduling algorithm with input information to utilize fading sub bands more efficiently for non-stationary communication nodes.

The solution also improves the transmission format selection when transmitting on a fraction of the total bandwidth through an improved channel quality estimate at the time of transmission.

The present solution improves frequency selective scheduling gain. Gain may be achieved for nodes at higher speed, or, a CQI-reporting rate may be decreased reducing uplink control signaling load.

The present solution utilizes information already existing in a base station, so a user equipment, e.g. a mobile phone, does not have to be specifically informed or aware of the method. This means that the method can be used for both new and old user equipments.

The present invention is not limited to the features and advantages mentioned above. A person skilled in the art will recognize additional features and advantages upon reading the following detailed description.

BRIEF DESCRIPTION OF THE DRAWINGS

The invention will now be further described in more detail in the following detailed description by reference to the appended drawings illustrating embodiments of the invention and in which.

DETAILED DESCRIPTION

The basic idea of the present solution is to use sub band CQI behavior to predict how a radio channel fades, i.e. how sub band CQI moves in frequency domain, and to use this knowledge as input to frequency selective scheduling and/or link adaptation.

Figure 1:
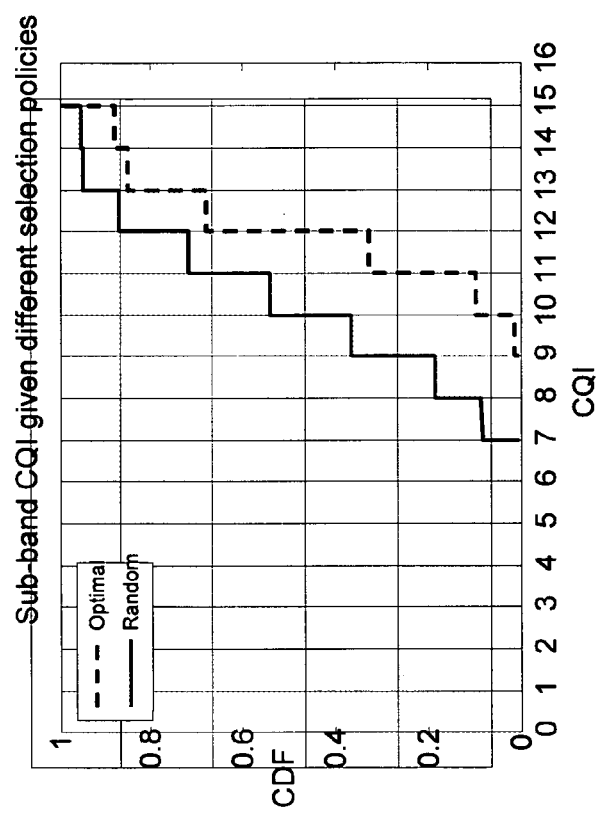
FIG. 1 is a graph illustrating CQI distributions.
Figure 2:
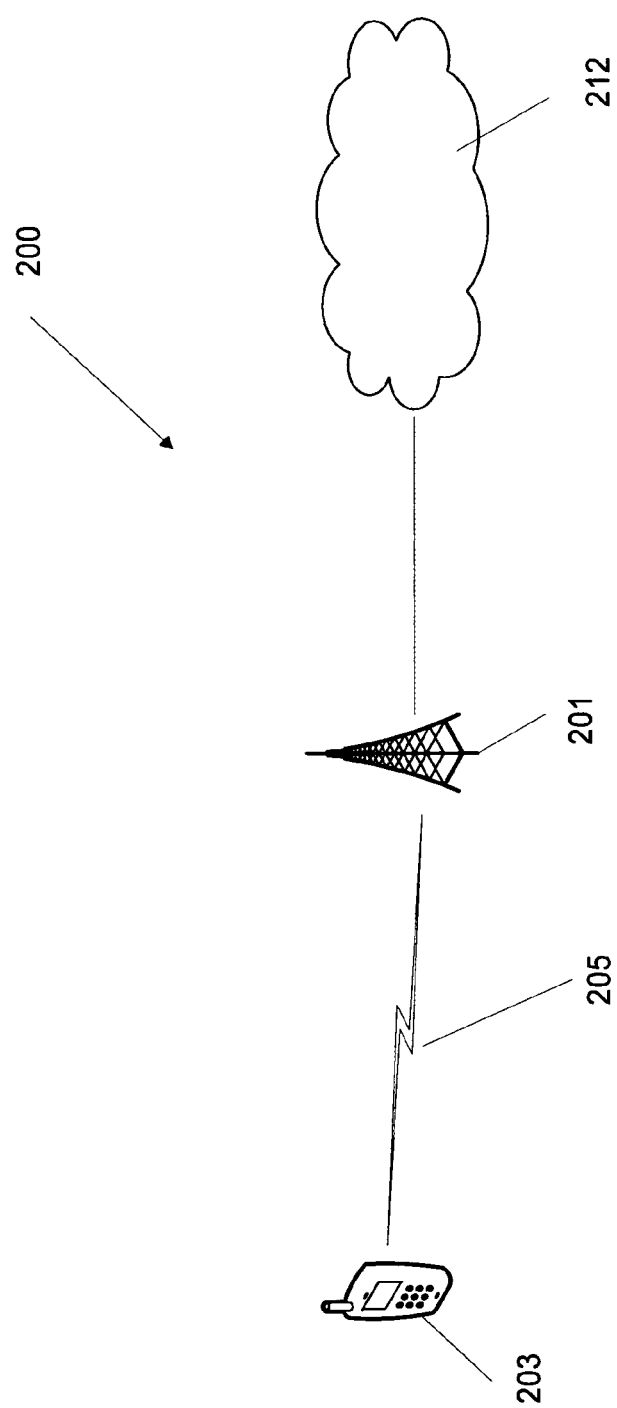
FIG. 2 is a schematic block diagram illustrating embodiments of a wireless communication network.

FIG. 2 is a schematic block diagram illustrating a wireless communication network 200. The network may use technologies such as e.g. LTE, WiMAX, or other radio access where the frequency band is divided into sub bands, etc. The network 200 comprises at least one first communication node 201 and at least one second communication node 203. The first communication node 201 may be e.g. a base station, eNodeB, etc. The second communication node 203 may be any suitable communication device or computational device with communication capabilities, for instance but not limited to user equipment, mobile phone, personal digital assistant (PDA), laptop, MP3 player, portable DVD player or similar media content devices, digital camera, or even stationary devices such as a PC. The first communication node 201 and the second communication node 203 communicates with each other using any suitable kind of wireless communication link 205. The communication link 205 may use any suitable protocol depending on type and level of layer, e.g. as indicated by the OSI model, as understood by the person skilled in the art.

The first communication node 201 may be connected to a core network 212 providing e.g. Internet services to the second communication node 203.

Further, a third communication node may be comprised in the network 200 (not shown). The third communication node may be e.g. a Radio Network Controller (RNC) or similar, etc. The third communication node may be in communication with the first communication node 201, only, or in communication with both the first 201 and second communication nodes 203.

It should be appreciated that the network 200 is configured with cabling, routers, switches, and other network building elements (not shown) as understood by the skilled person, for instance as used for building an Ethernet or WAN network.

The present solution method for determining an indication of channel quality of a radio channel 205 between the first communication node 201 and the second communication node 203, according to some embodiments will now be described with reference to the combined signalling diagram and flowchart depicted in FIG. 3. The method comprises the following steps, which steps may as well be carried out in another suitable order than described below:

Step 301

The second communication node 203 provides a channel quality report. The channel quality report comprises an indication of CQI per sub band, as average absolute and delta/sub band at different time instances.

To provide the channel quality report, the second communication node 203 may measure radio quality frequency selectively. E.g. it may estimate CQI per sub band according to standard. The CQI may be estimated as specified by the 3$^{rd}$ Generation Partnership Project (3GPP) indicating highest modulation and coding <10% Block Error Rate (BLER).

Step 302

The second communication node 203 transmits the channel quality report to the first communication node 201.

The channel quality report may be transmitted to the first communication node 201 at regular intervals, or when triggered.

Step 303

The first communication node 201 obtains the channel quality report and estimates a channel quality deviation based on the obtained report and earlier reports.

A channel quality report may comprises a CQI indication per sub band at the time t=0. The time instance t=0 is the time instance for measuring the channel quality generating the current CQI report. In addition, a number of "old" CQI indications per sub band are retained in a memory, i.e. reports for the time instances t=−1, −2, −3 . . . . This is illustrated in Table 1 below.

TABLE 1

| | Known information | | | | Unknown information |
|---|---|---|---|---|---|
| Sub band 1 | CQI1(−3) | CQI1(−2) | CQI1(−1) | CQI1(0) | CQI1(t0) |
| Sub band 2 | CQI2(−3) | CQI2(−2) | CQI2(−1) | CQI2(0) | → CQI2(t0) |
| Sub band 3 | CQI3(−3) | CQI3(−2) | CQI3(−1) | CQI3(0 | CQI3(t0) |
| Sub band 4 | CQI4(−3) | CQI4(−2) | CQI4(−1) | CQI4(0) | CQI4(t0) |
| . . . | | | | | |
| Time | −3 | −2 | −1 | 0 | t0 |

The CQI indications that are intended for use at the measured time instance, i.e. at the time t=0 is out-dated due to delays in the reporting of the CQI report, and due to processing. The CQI indication is first used at the time instance t=t0, where t0 is the delay. It is therefore necessary to reduce the error e(t0)=CQI(t0)−CQI(0) by predicting how the CQI indications will develop from the time 0 to time t0. This may be done by using historical data for the same sub band, i.e. CQI2(t0)=f({CQI2(0), CQI2(−1), . . . }), where f is some function. The selection of the function $f$ will be described later. Table 2 below illustrates that only the CQI indications from the same sub band (underlined) are used for predicting a future CQI indication. As mentioned above, only the time evolution of the CQI values is considered.

TABLE 2

| | Known information | | | | Unknown information |
|---|---|---|---|---|---|
| Sub band 1 | CQI1(−3) | CQI1(−2) | CQI1(−1) | CQI1(0) | CQI1(t0) |
| Sub band 2 | <u>CQI2(−3)</u> | <u>CQI2(−2)</u> | <u>CQI2(−1)</u> | <u>CQI2(0)</u> → | <u>CQI2(t0)</u> |
| Sub band 3 | CQI3(−3) | CQI3(−2) | CQI3(−1) | CQI3(0) | CQI3(t0) |

TABLE 2-continued

|  | Known information | | | | Unknown information |
|---|---|---|---|---|---|
| Sub band 4 | CQI4(−3) | CQI4(−2) | CQI4(−1) | CQI4(0) | CQI4(t0) |
| ... | | | | | |
| Time | −3 | −2 | −1 | 0 | t0 |

The present solution relates to a way of predicting how the CQI indications may develop from the time t=0 to time t=t0 for a specific sub band, e.g. sub band 2. The CQI report for the time t=0 is out-dated due to delays in the reporting of the CQI report, and due to processing. The time instance t=0 is the time instance for generation of the current CQI report. In addition, a number of "old" CQI indications per sub band are retained in a memory, i.e. reports for the time instances t=−1, −2, −3 .... The CQI indication is first used at the time instance t=t0, where t0 is the delay. It is therefore necessary to reduce the error e(t0)=CQI(t0)−CQI(0) by predicting how the CQI indications will develop from the time 0 to time t0. This is done by using CQI indications from other sub bands than the specific sub band, e.g. sub band 2, to follow the channel variations in time and frequency, and to improve the CQI predications. E.g. CQI2(t0)=f({CQI1(0),CQI1(−1), ... }, {CQI2(0),CQI2(−1), ... }, {CQI3(0),CQI3(−1), ... }) may be used. The complete set of available CQI indications is a function of time and frequency/sub band. This is also illustrated schematically in Table 3 below.

TABLE 3

|  | Known information | | | | Unknown information |
|---|---|---|---|---|---|
| Sub band 1 | CQI1(−3) | CQI1(−2) | CQI1(−1) | CQI1(0) | CQI1(t0) |
| Sub band 2 | CQI2(−3) | CQI2(−2) | CQI2(−1) | CQI2(0) | CQI2(t0) |
| Sub band 3 | CQI3(−3) | CQI3(−2) | CQI3(−1) | CQI3(0) | CQI3(t0) |
| Sub band 4 | CQI4(−3) | CQI4(−2) | CQI4(−1) | CQI4(0) | CQI4(t0) |
| ... | | | | | |
| Time | −3 | −2 | −1 | 0 | t0 |

In other words, it is the latest received CQI indication measured at time t=0 that is going to be replaced by the predicted CQI's (t=t0), and when this prediction is performed for a given sub band, e.g. sub band 2, CQI indications from more than one time instance, t=0, t=−1, ... , and more than one sub band, e.g. 1, 2, 3, ... , may be used.

The selection of the function $f$ mentioned above may be done in different ways. In one embodiment it may be possible to "train" or optimize the selection by e.g. to predict for the time instance t=0 with regards to t=1, −2, −3, .... This way, it is possible to compare the prediction with known answers as the CQI indication for time t=0 is already known.

For instance, one may consider the following three candidate functions:

$$CQI\_N(t0)=CQI\_N-1(0),$$

$$CQI\_N(t0)=CQI\_N(0),$$

$$CQI\_N(t0)=CQI\_N+1(0),$$

where N is the sub band number.

The functions represent taking either the currently reported sub band CQI, or the reported CQI for either of the two neighboring sub bands. In a given situation, the three candidate functions may be evaluated using older reports, for instance by predicting the CQI at time t=0 using CQI reports at time t=−1. The predictions of each of the three candidate functions can then be compared with the actual reported CQI at time t=0, and the function that results in the smallest prediction error can be selected for the predictions for time t=t0. The function may also be provided by using a statistical model. E.g. a minimum prediction error may be determined for one of the plurality of sub bands using a statistical model. The statistical model may being one of Maximum Likelihood Estimation "MLE", Mean Square Error "MSE", Minimum Distance Estimation "MDE" and Quasi-Maximum Likelihood Estimate "QMLE".

Figure 4A:
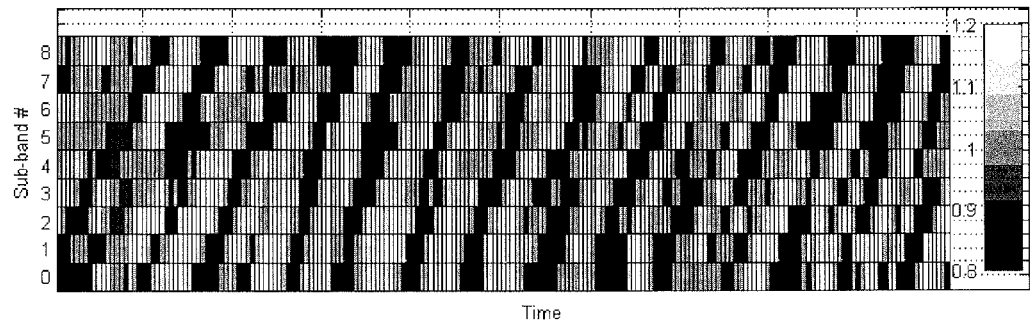
FIG. 4*a* is a graph illustrating a CQI time versus sub band pattern.

An example of a CQI time versus sub band pattern measured using an experimental LTE device operating in a cellular network is presented in FIG. 4a. This typical band-vice pattern occurs when the radio channel have a few dominating rays (strong radio paths with reflections). Other ray constellations cause other CQI sub band gain patterns, more specifically fast fading patterns. In this context, a "ray" means the electromagnetic wave corresponding to the information signal between the first communication node 201 and the second communication node 203.

Given a non-static radio channel 205 and that the channel 205 fades and that fading dips one way or another drift in the frequency domain, it is unlikely that best upcoming frequency, i.e. sub band, will occur at the same position continuously. A more probable scenario may be that best sub band at a later time instance will be some of the neighboring sub bands.

The grey scales in FIG. 4a reflects sub band and time instances during which better sub band than wideband CQI, i.e. '$CQI_{sub\ band}/CQI_{wide\ band}>1$' is achieved. Hence, the diagonal light regions (>1) seen in FIG. 4a could be utilized as input to a Frequency Selective Scheduling (FSS) algorithm, which in turn with higher probability could choose CQI sub bands with better gain to interference ratios.

The diagonal banded structure in FIG. 4a may be observed independently also in dedicated radio channel measurements. A similar example from a radio channel measurement is presented in FIG. 4b. The regions of high channel gain, indicated by lighter colors in the figure, can be seen to move in frequency as a function of time, similar to the behavior in FIG. 4a. Not all radio channels will show such trends, but inspection of numerous channel measurements indicates that it is not an uncommon behavior.

Figure 4B:
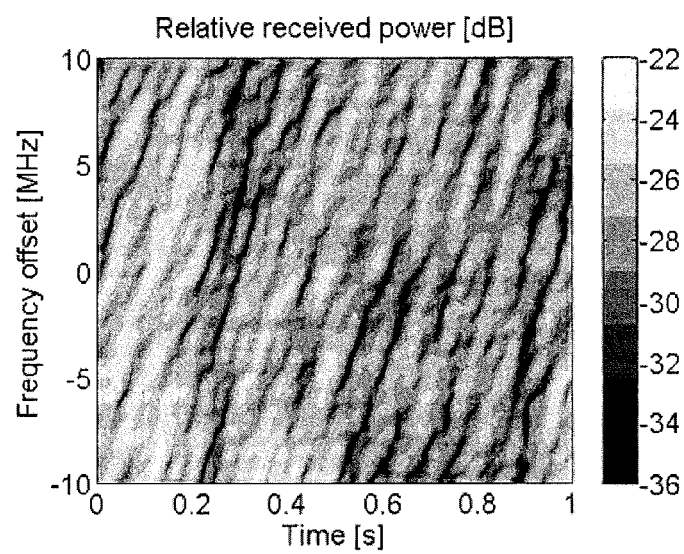
FIG. 4b is a graph illustrating a measured time-frequency channel.

To illustrate the physical background that gives rise to the particular structure shown in FIG. 4a and FIG. 4b, i.e. the time-frequency response of the channel, consider the following scenario:

A two-ray channel, with one ray having amplitude 1, delay 0, and direction of arrival=0, and a second ray having amplitude 1, delay $\tau$, and direction of arrival=$\phi$. The second communication node 203 is assumed to move with velocity v in the direction $\pi/2$. For this case, the radio channel 205 may be expressed as:

$$H(t, f) = \exp(2\pi i \cos(0 - \pi/2)vt/\lambda) \cdot \exp(2\pi i f \cdot 0) + \ldots +$$

$$\exp(2\pi i \cos(\varphi - \pi/2)vt/\lambda) \cdot \exp(2\pi i f \tau)$$

$$= 1 + \exp(2\pi i \sin(\varphi)vt/\lambda) \cdot \exp(2\pi i f \tau)$$

Figure 5:
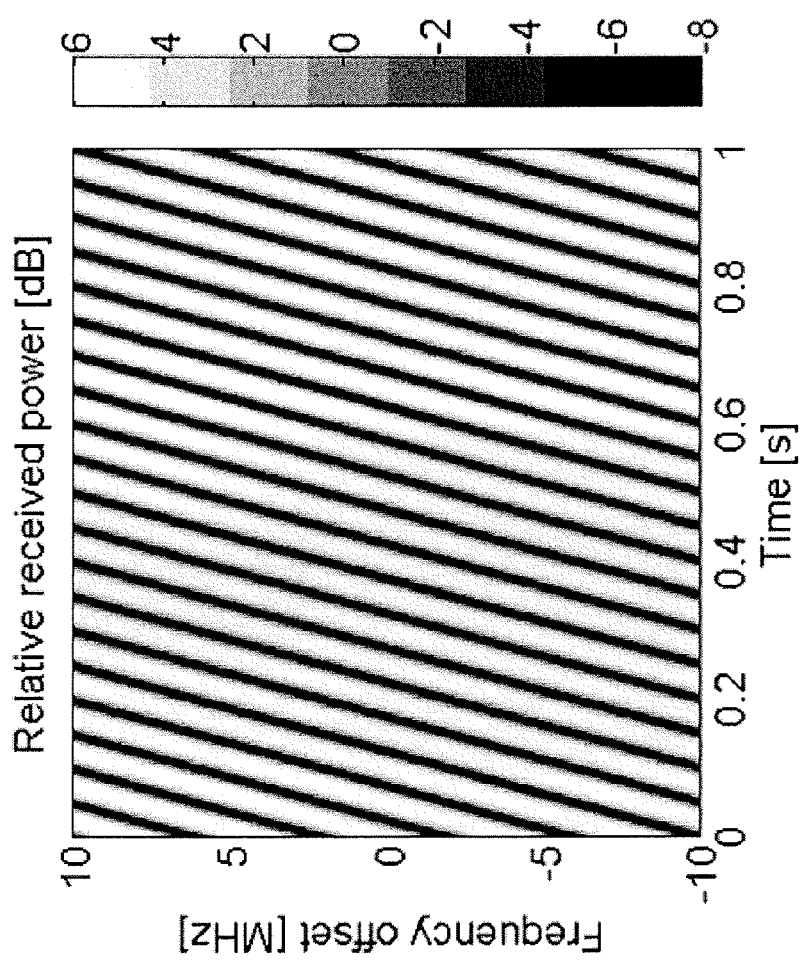
FIG. 5 is a graph illustrating a time frequency channel for a two-ray channel.

With the assumptions that $\sin(\phi)v/\lambda=20$ Hz and $\tau=0.25$ μs the resulting channel may be as depicted in FIG. 5. This figure shows a banded structure quite similar to what observed in the measurements illustrated in FIG. 4a and FIG. 4b.

In general, there will be many more than two rays making up the channel 205 between a transmitter in the second communication node 203 and a receiver in the first communication node 201. However, not all rays will be equally strong, and therefore it may be expected that some parts of the diagonal structure may be present also in more complex channels, in particular when two rays are dominating in power over the others.

The second communication node 203 may estimate a speed dependent CQI-drift/deviation in frequency, i.e. sub band, for example by using the following two steps:
1) The maximum or minimum delta CQI per reported time t is identified.
2) The sub band movement for maximum CQI is measured.

Figure 6:
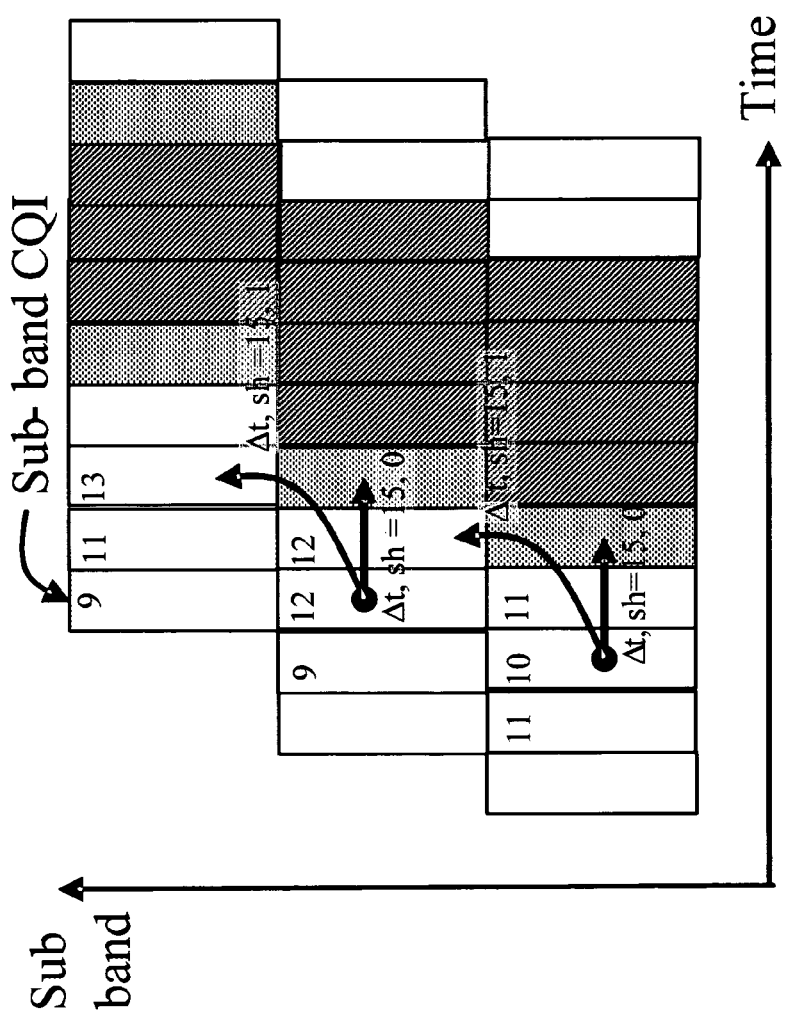
FIG. 6 is a graph illustrating typical CQI band drift pattern.

Step 1) and 2) above may be implemented by using the following example algorithm for handling the banded structure:

$$[\text{ind\_sb}] = \max(\text{CQI subband}(t=t_1)), \quad (1)$$

$$\text{CQI}(t=t_1+\Delta t) = \text{CQI}(t=t_1+\Delta t; \text{ind\_sb}\pm\text{shift}), \quad (2)$$

where $\Delta t$ corresponds to the typical delay and ±shift corresponds to a speed dependent sub band offset that tracks the CQI drift seen in FIG. 4a. The algorithm behavior is illustrated in FIG. 6, which is a sample of CQI-reports from FIG. 4a. $\Delta t$ is two CQI-report intervals and shift is found to be =1 by finding maximum CQI=12 at second sub band and $\Delta t$ later maximum CQI=13 is moved to third sub band. The best sub band will similarly drift in the frequency domain.

The actual delay may also be taken into account at every scheduling instance. The actual delay may also be taken into account for each sub band, since the time when the latest received sub band CQI is estimated by the second communication node 203 is known in the first communication node 201.

From FIG. 6 it can be understood that it is possible to benefit from compensating for the sub band drift according to the example algorithm. The overall gain will hence be a function of the CQI delay, communication node speed and radio channel properties.

Applying the exemplifying algorithm to CQI data recorded in an experimental LTE device operating in a cellular network, with settings resembling 15 ms delay and no sub band drift compensation, as expected, the resulting CQI will be significantly worse than optimally.

In some embodiments, optimal shift may be achieved comparing different shift factors on historical data gathered near in time. To ensure stability, the algorithm should retreat back to zero sub band shift if no gain may be derived on historical data.

Returning to FIG. 3.
Step 304
The first communication node 201 determines a channel quality indication based on the estimated channel quality deviation.

Figure 3:
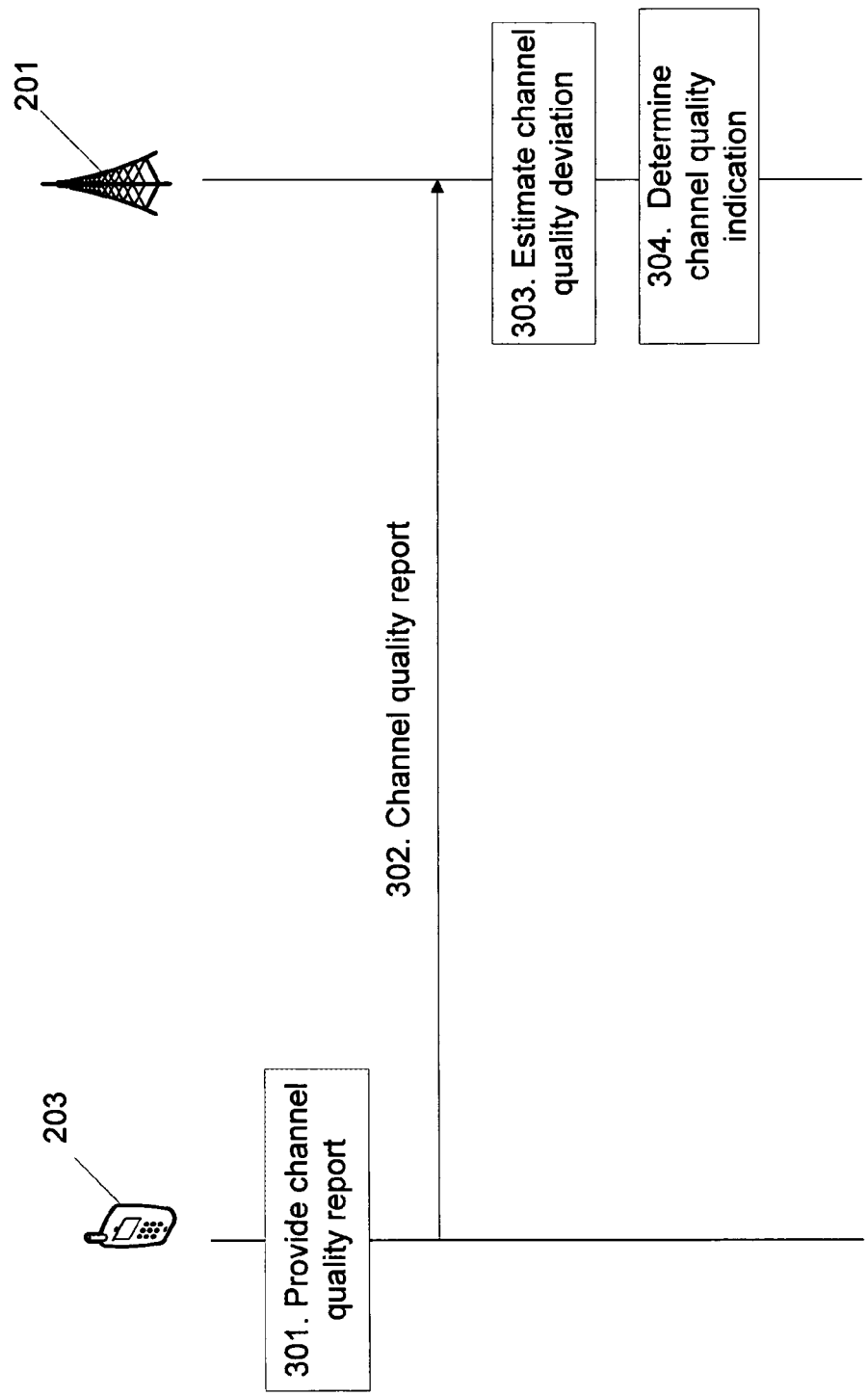
FIG. 3 is a combined signalling diagram and flowchart depicting embodiments of a method.

The method shown in FIG. 3 may be used for frequency scheduling and for link adaptation.

When the second communication node 203 is scheduled to use a specific radio channel, the latest reported sub band CQI's are shifted according to delta-f/delta-t, where delta-t=t-t (latest reported CQI including reporting delay).

As mentioned above, the network 200 may comprise a third communication node. In an alternative embodiment of the method described in relation to FIG. 3, the scheduling may be performed in the third communication node. The first communication node 201 measures uplink channel quality per sub band and reports it to the third communication node. The third communication node can then apply the method to compensate for the delay error from measurement. The third communication node may be a RNC or similar.

The method may also be applicable on user equipment selected best sub band CQI-reporting. Eq. (1) is then performed in the second communication node 203 reporting only the sub band(s) with best CQI. The deviation prediction may be done in the first communication node 201.

Figure 7:
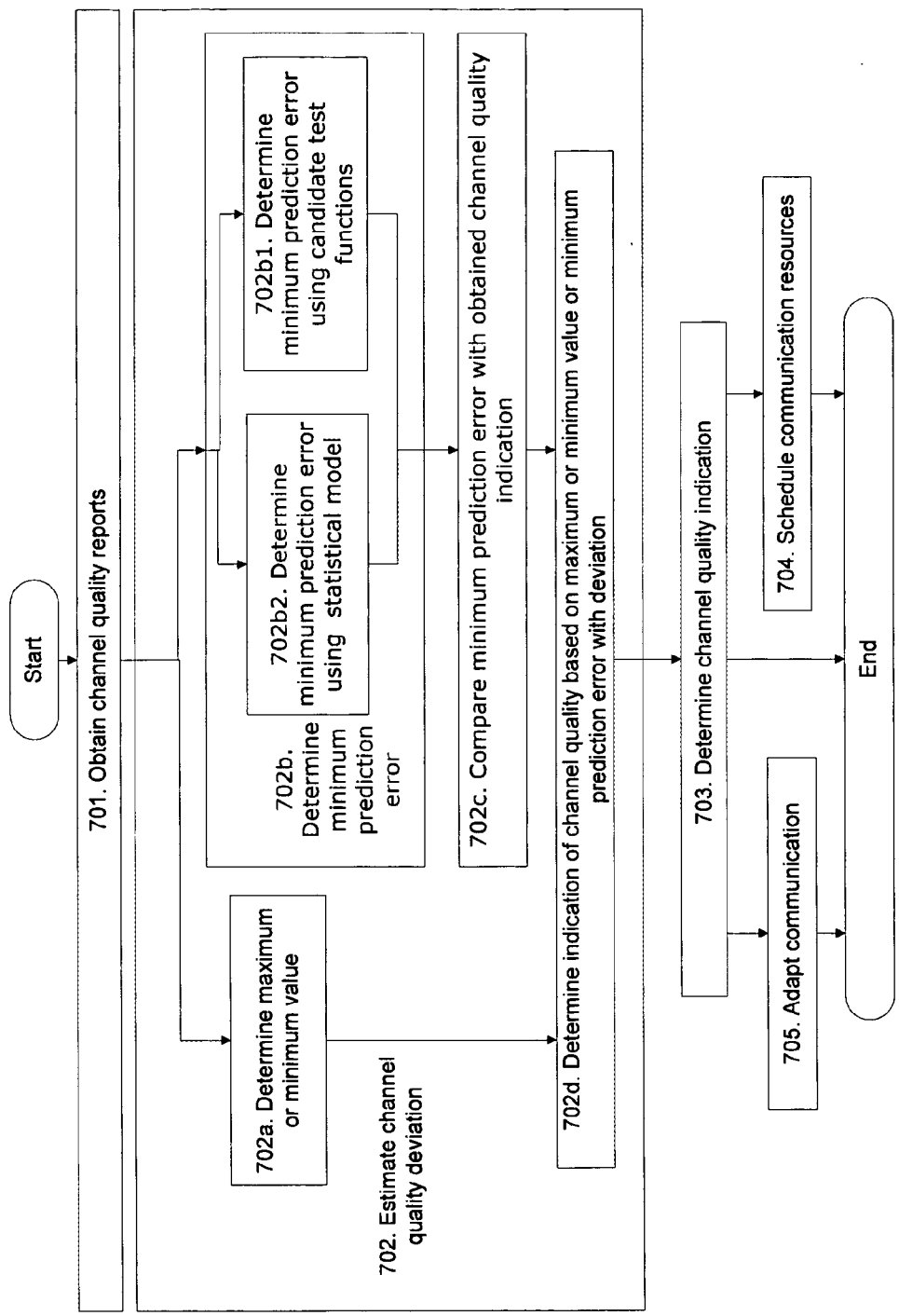
FIG. 7 is a flowchart depicting embodiments of a method in a first communication node.

The method described above will now be described seen from the perspective of the first communication node 201. FIG. 7 is a flowchart describing the present method in the first communication node 201, for determining an indication of channel quality of a radio channel 205 between the first communication node 201 and the second communication node 203. As mentioned above, the first communication node 201 and the second communication node 203 are comprised in a wireless communication network 200. The radio channel 205 comprises a plurality of sub bands. The first communication node 201 may be a base station and the second communication node 203 may be a user equipment. The channel quality may be downlink channel quality from the first communication node 201 to the second communication node 203.

In some embodiments, the wireless communication network 200 may comprise a third communication node. The third communication node may be a network controller, such as e.g. a Radio Network Controller, RNC. The channel quality may be uplink channel quality from the second communication node 203 to the first communication node 201.

The method comprises the following steps to be performed in the first communication node 201. The steps may be performed in any suitable order.
Step 701
The first communication node 201 obtains at least two channel quality reports for different time instances. Each channel quality report comprises an indication of channel quality of at least two of the plurality of sub bands.

The at least two channel quality reports may be obtained by receiving the channel quality reports from the second communication node 203.

The channel quality report may be a function of time and frequency.
Step 702
A channel quality deviation is estimated for at least one of the plurality of sub bands based on the channel quality indicated in at least two of the most recent obtained channel quality reports and based on the obtained channel quality indications of at least two sub bands.

The step of estimating a channel quality deviation may be performed in the second communication node 203.
Step 702a
This is an optional step which will be taken in a first embodiment of step 702. A maximum or minimum value of channel quality indication for one of the plurality of sub bands may be determined.

Step 702b

This is an optional step which will be taken in a second embodiment of step 702. A minimum prediction error may be determined for one of the plurality of sub bands.

Step 702b1

This is an optional step which will be taken in a first embodiment of step 702b. A minimum prediction error may be determined for one of the plurality of sub bands using candidate test functions. Candidate test functions may be applied on historical data to derive the best, e.g. the most accurate, prediction method, shift value, to use at a specific time instance.

Step 702b2

This is an optional step which will be taken in a second embodiment of step 702b. A minimum prediction error may be determined for one of the plurality of sub bands using a statistical model. The statistical model may be one of Maximum Likelihood Estimation "MLE", Mean Square Error "MSE", Minimum Distance Estimation "MDE" and Quasi-Maximum Likelihood Estimate "QMLE".

Step 702c

This is an optional step to be performed in the second embodiment of step 702, and after the step 702b. The minimum prediction error may be compared with the obtained channel quality indication.

Step 702d

This is an optional step to be formed in the first and second embodiment of step 702. An indication of channel quality may be determined based on the maximum or minimum value and estimated channel quality deviation, or based on the compared minimum prediction error and estimated channel quality deviation.

Step 703

In this step, an indication of a channel quality is determined for at least one of the plurality of sub bands based on the estimated channel quality deviation for the at least one of the plurality of sub bands.

Step 704

This is an optional step. A communication resource may be scheduled between the first communication node 201 and the second communication node 203 based on the determined indication of channel quality for at least one of the plurality of sub bands. This may also be Multi-User MIMO scheduling transmitting on the same resource block and sub band for two different user equipments.

Step 705

This is an optional step. The communication on the radio channel 205 between the first communication node 201 and the second communication node 203 may be adapted based on the determined indication of channel quality for at least one of the plurality of sub bands. Adaptation of communication may for example be selecting transmission format such as modulation and coding or power control of transmission.

Figure 8:
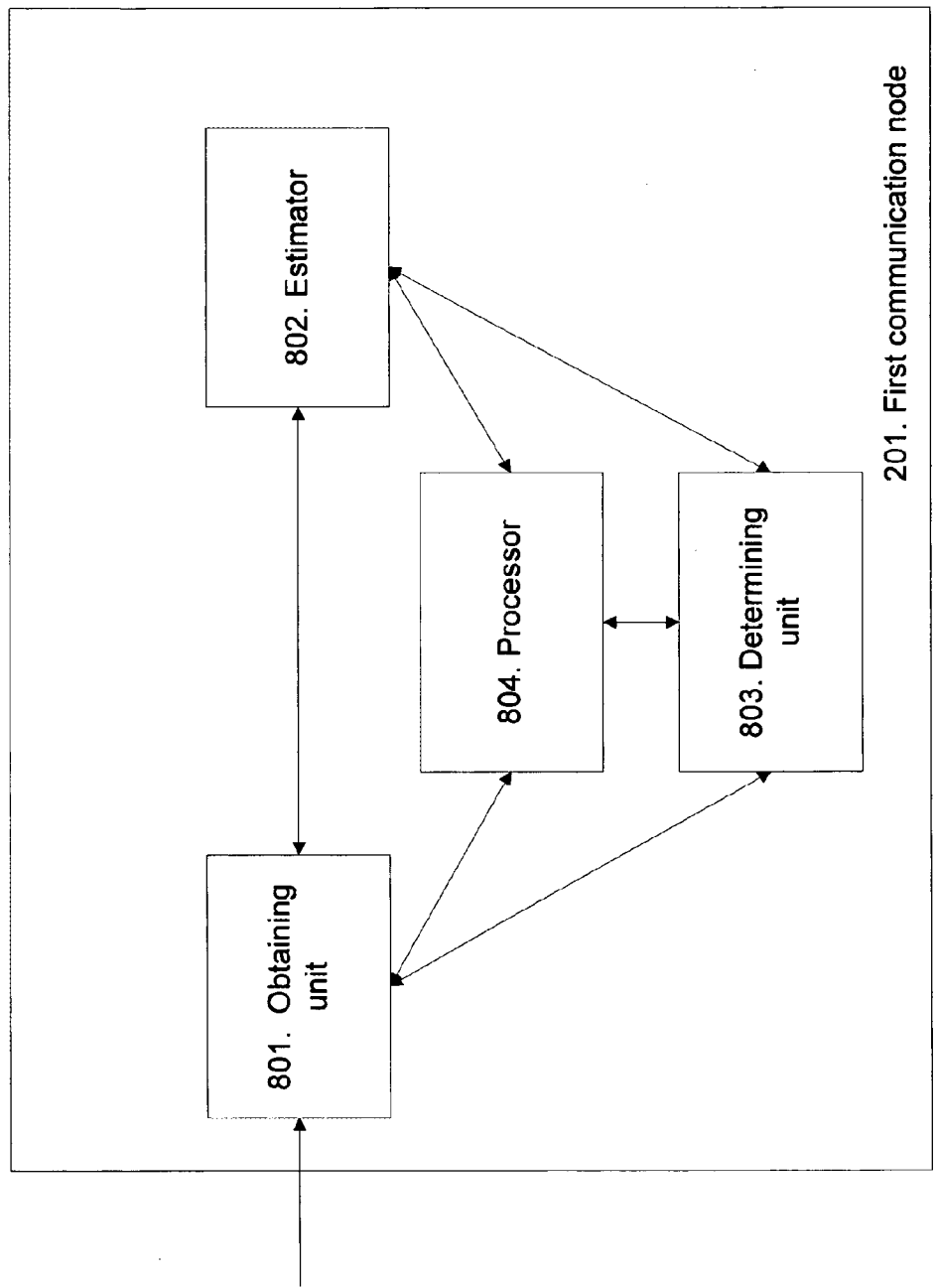
FIG. 8 is a schematic block diagram illustrating embodiments of a first communication node.

To perform the method steps shown in FIG. 7 for determining an indication of channel quality of a radio channel 205 between the first communication node 201 and the second communication node 203, the first communication node 201 comprises an arrangement as shown in FIG. 8. The first communication node 201 is configured to determine an indication of channel quality of a radio channel 205 between the first communication node 201 and a second communication node 203. The first communication node 201 and the second communication node 203 are comprised in the wireless communication network 200. The radio channel 205 comprises a plurality of sub bands.

The first communication node 201 comprises an obtaining unit 801 configured to obtain at least two channel quality reports for different time instances. Each channel quality report comprises indications of channel quality of at least two of the plurality of sub bands.

The first communication node 201 also comprises an estimator 802 which is configured to estimate a channel quality deviation for at least one of the plurality of sub bands based on the channel quality indicated in at least two of the most recent obtained channel quality reports and based on the obtained channel quality indications of at least two sub bands. The estimator 802 may also be configured to determine a maximum or minimum value of channel quality indication for one of the plurality of sub bands, and to determine an indication of channel quality based on the maximum or minimum value and estimated channel quality deviation. Further, the estimator 802 may be configured to determine a minimum prediction error for at least one of the plurality of sub bands, compare the minimum prediction error with the obtained channel quality indication, and to determine an indication of channel quality based on the maximum or minimum value and estimated channel quality deviation. The estimator 802 may even be further configured to determine a minimum prediction error for at least one of the plurality of sub bands using candidate test functions. The estimator may be configured to determine a minimum prediction error for at least one of the plurality of sub bands using a statistical model, the statistical model being one of Maximum likelihood estimation "MLE", mean square error "MSE", Minimum distance estimation "MDE", quasi-maximum likelihood estimate "QMLE".

Further, the first communication node 201 comprises a determining unit 803 which is configured to determine an indication of channel quality for at least one of the plurality of sub bands based on the estimated channel quality deviation for at least one of the plurality of sub bands. The determining unit 803 may be further configured to schedule communication resources between the first communication node 201 and the second communication node 203 based on the determined indication of channel quality for at least one of the plurality of sub bands. The determining unit 803 may also be configured to adapt the communication on the radio channel 205 between the first communication node 201 and second communication node 203 based on the determined indication of channel quality for at least one of the plurality of sub bands.

Figure 9:
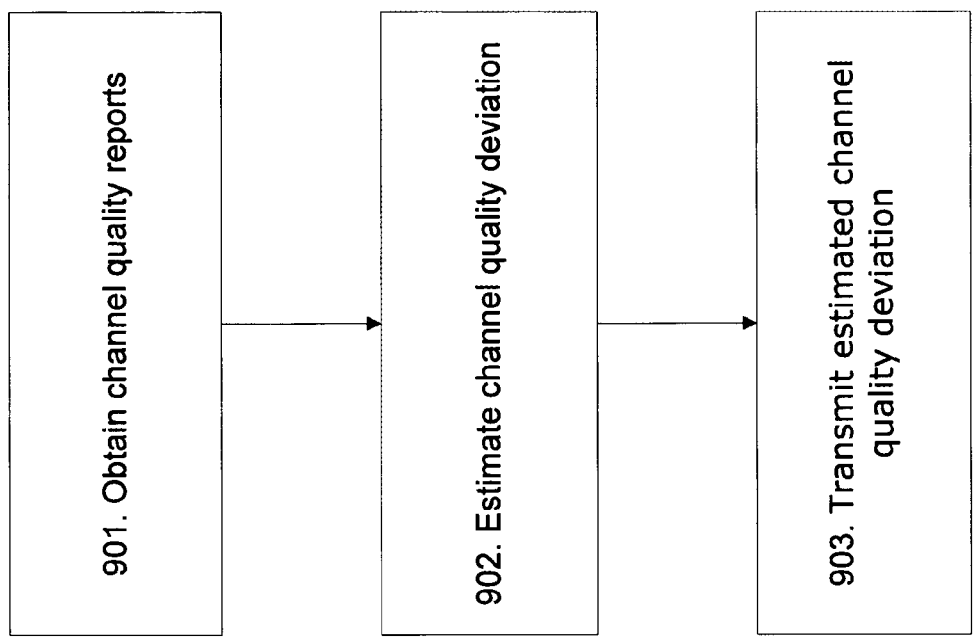
FIG. 9 is a flowchart depicting embodiments of a method in a second communication node.

The method described above will now be described seen from the perspective of the second communication node 203. FIG. 9 is a flowchart describing the present method in the second communication node 203, for determining an indication of channel quality of a radio channel 205 between a first communication node 201 and the second communication node 203. As mentioned above, the first communication node 201 and the second communication node 203 are comprised in a wireless communication network 200. The radio channel 205 comprises a plurality of sub bands. The first communication node 201 may be a base station and the second communication node 203 may be a user equipment. The channel quality may be downlink channel quality from the first communication node 201 to the second communication node 203.

In some embodiments, the wireless communication network 200 may comprise a third communication node. The third communication node may be a network controller, such as e.g. a Radio Network Controller, RNC. The channel quality may be uplink channel quality from the second communication node 203 to the first communication node 201.

The method comprises the following steps to be performed in the second communication node 203. The steps may be performed in any suitable order.

Step 901

The second communication node 203 obtains at least two channel quality reports for different time instances. Each channel quality report comprising indications of channel quality of at least two of the plurality of sub bands.

The channel quality report may be a function of time and frequency.

Step 902

The second communication node 203 estimates a channel quality deviation for at least one of the plurality of sub bands based on the channel quality indicated in at least two of the most recent obtained channel quality reports and based on the obtained channel quality indications of at least two sub bands.

Step 902a

This is an optional step to be taken in a first embodiment of step 902 A maximum or minimum value of channel quality indication for one of the plurality of sub bands may be determined.

Step 902b

This is an optional step which will be taken in a second embodiment of step 902. A minimum prediction error may be determined for one of the plurality of sub bands.

Step 902b1

This is an optional step which will be taken in a first embodiment of step 902b. A minimum prediction error may be determined for one of the plurality of sub bands using candidate test functions. Candidate test functions may be applied on historical data to derive the best, e.g. the most accurate, prediction method, shift value, to use at a specific time instance.

Step 902b2

This is an optional step which will be taken in a second embodiment of step 902b. A minimum prediction error may be determined for one of the plurality of sub bands using a statistical model. The statistical model may be one of Maximum Likelihood Estimation "MLE", Mean Square Error "MSE", Minimum Distance Estimation "MDE" and Quasi-Maximum Likelihood Estimate "QMLE".

Step 902c

This is an optional step to be performed in the second embodiment of step 902, and after the step 902b. The minimum prediction error is compared with the obtained channel quality indication.

Step 902d

This is an optional step. An indication of channel quality may be determined based on the maximum or minimum value and estimated channel quality deviation, or based on the compared minimum prediction error and estimated channel quality deviation.

Step 903

After the channel quality deviation is estimated, the second communication node 203 transmits the estimated channel quality deviation to the first communication node.

Figure 10:
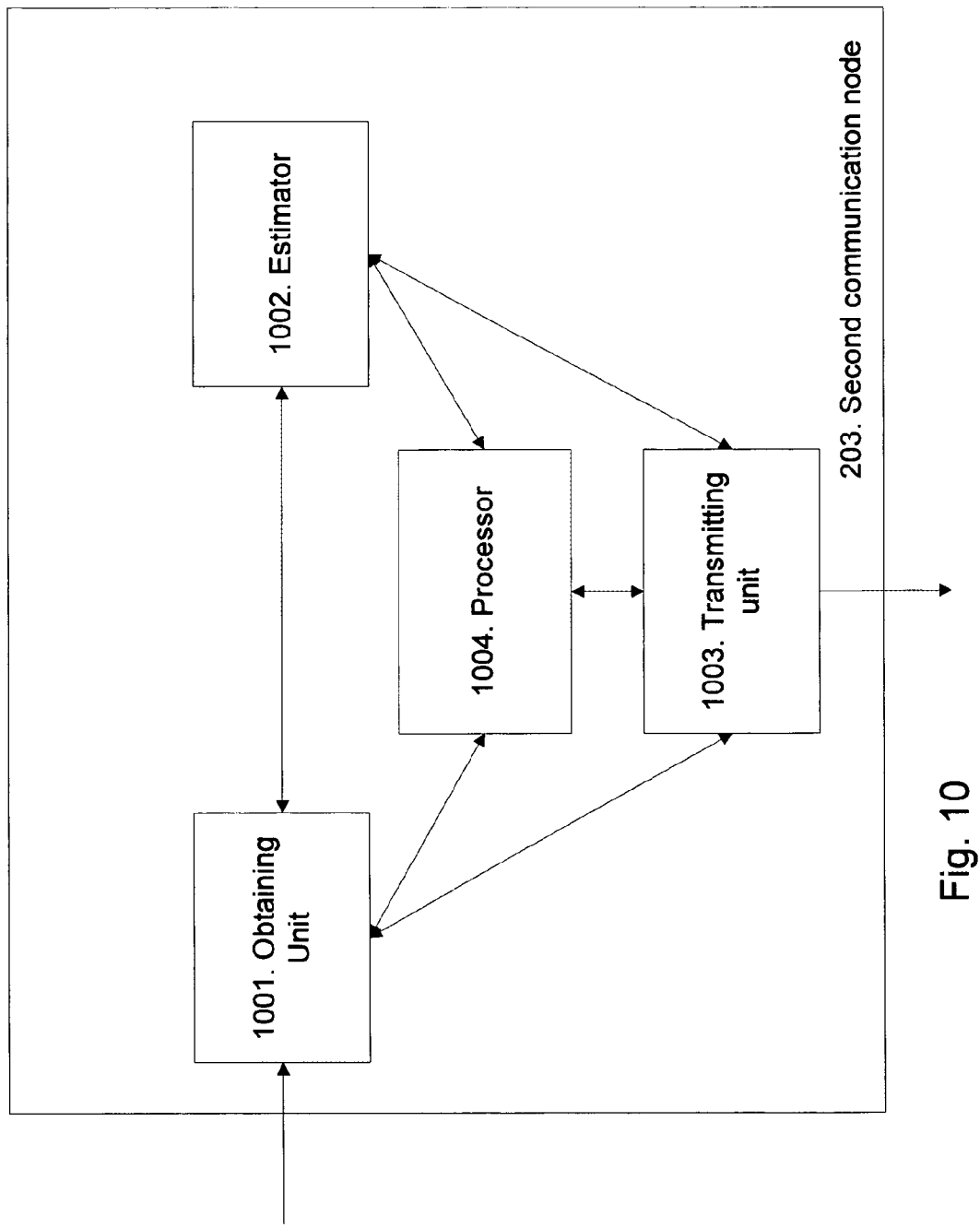
FIG. 10 is a schematic block diagram illustrating embodiments of a second communication node.

To perform the method steps shown in FIG. 9 for determining an indication of channel quality of a radio channel 205 between the first communication node 201 and the second communication node 203, the second communication node 203 comprises an arrangement as shown in FIG. 10. The second communication node 203 is configured to determine an indication of channel quality of a radio channel 205 between the first communication node 201 and the second communication node 203. The first communication node 201 and the second communication node 203 are comprised in the wireless communication network 200. The radio channel 205 comprises a plurality of sub bands.

The second communication node 203 comprises an obtaining unit 1001 configured to obtain at least two channel quality reports for different time instances. Each channel quality report comprises indications of channel quality of at least two of the plurality of sub bands.

The second communication node 203 further comprises an estimator 1002 configured to estimate a channel quality deviation for at least one of the plurality of sub bands based on the channel quality indicated in at least two of the most recent obtained channel quality reports and based on the obtained channel quality indications of at least two sub bands. The estimator 1002 may also be configured to determine a maximum or minimum value of channel quality indication for one of the plurality of sub bands, and to determine an indication of channel quality based on the maximum or minimum value and estimated channel quality deviation. Further, the estimator 1002 may be configured to determine a minimum prediction error for at least one of the plurality of sub bands, compare the minimum prediction error with the obtained channel quality indication, and to determine an indication of channel quality based on the maximum or minimum value and estimated channel quality deviation. The estimator 1002 may even be further configured to determine a minimum prediction error for at least one of the plurality of sub bands using candidate test functions. The estimator may be configured to determine a minimum prediction error for at least one of the plurality of sub bands using a statistical model, the statistical model being one of Maximum likelihood estimation "MLE", mean square error "MSE", Minimum distance estimation "MDE", quasi-maximum likelihood estimate "QMLE".

The second communication node 203 also comprises a transmitting unit 1003 configured to transmit the estimated channel quality deviation to the first communication node 201.

The present mechanism for determining an indication of channel quality of a radio channel 205 between the first communication node 201 and the second communication node 203 may be implemented through one or more processors, such as a processor 804 in the first communication node 201 depicted in FIG. 8 and/or such as a processor 1004 in the second communication node 203 depicted in FIG. 10, together with computer program code for performing the functions of the present solution. The program code mentioned above may also be provided as a computer program product, for instance in the form of a data carrier carrying computer program code for performing the present solution when being loaded into the first communication node 201 and/or second communication node 203. One such carrier may be in the form of a CD ROM disc. It is however feasible with other data carriers such as a memory stick. The computer program code may furthermore be provided as pure program code on a server and downloaded to the first communication node 201 and/or to the second communication node 203.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasised that the steps of the methods defined in the appended claims may, without departing from the present invention, be performed in another order than the order in which they appear in the claims.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method, in a first communication node, for determining a revised indication of channel quality of a radio channel between the first communication node and a second communication node, wherein the radio channel comprises a plurality of sub-bands, the method comprising:

obtaining at least two channel quality reports, each channel quality report corresponding to a different time instance, wherein each channel quality report includes indications of channel quality corresponding to each of at least two of the plurality of sub-bands;

estimating a channel quality deviation for at least one of the plurality of sub-bands, based on channel quality indications included in at least two of the most recently obtained channel quality reports, said channel quality indications comprising indications corresponding to at least two sub-bands and at least two different time instances; and determining said revised indication of said channel quality for at least one of the plurality of sub-bands based on the estimated channel quality deviation for the at least one of the plurality of sub-bands.

2. The method of claim 1, wherein the at least two channel quality reports are obtained from the second communication node.

3. The method of claim 1, further comprising scheduling a communication resource between the first communication node and the second communication node based on the revised indication of channel quality for at least one of the plurality of sub-bands.

4. The method of claim 1, further comprising adapting the communication on the radio channel between the first communication node and the second communication node based on the revised indication of channel quality for at least one of the plurality of sub-bands.

5. The method of claim 1, wherein the channel quality report is a function of time and frequency.

6. The method of claim 1, wherein estimating a channel quality deviation comprises:

determining a first sub-band having a maximum value of its corresponding channel quality indication (CQI) from within the CQIs comprised within a first channel quality report;

determining a second sub-band having a maximum value of its corresponding CQI from within the CQIs comprised within a second channel quality report; and estimating a CQI drift in time, frequency, or both time and frequency based upon said determined first sub-band and said determined second sub-band.

7. The method of claim 1, wherein said estimating a channel quality deviation comprises:

determining a minimum prediction error for at least one of the plurality of sub-bands, and comparing the minimum prediction error with the obtained channel quality indication; and wherein said determining a revised indication of channel quality is based on the compared minimum prediction error value and the estimated channel quality deviation.

8. The method of claim 7, wherein determining a minimum prediction error comprises determining a minimum prediction error for at least one of the plurality of sub-bands using candidate test functions.

9. The method of claim 7, wherein determining a minimum prediction error comprises determining a minimum prediction error for at least one of the plurality of sub-bands using a statistical model, the statistical model being one of Maximum-likelihood estimation (MLE), mean-square-error (MSE), Minimum-distance estimation (MDE), and quasi-maximum-likelihood estimate (QMLE).

10. The method of claim 1, wherein the first communication node is a base station and the second communication node is a user equipment, and wherein the channel quality is downlink channel quality from the first communication node to the second communication node.

11. The method of claim 1, wherein the estimating a channel quality deviation is performed in the second communication node.

12. The method of claim 1, wherein the wireless communication network comprises a third communication node, wherein the first communication node is a base station and the third communication node is a network controller, and wherein the channel quality is uplink channel quality from the second communication node to the first communication node.

13. The method of claim 1, wherein estimating a channel quality deviation comprises:

determining a first sub-band having a minimum value of its corresponding channel quality indication (CQI) from within the CQIs comprised within a first channel quality report;

determining a second sub-band having a minimum value of its corresponding CQI from within the CQIs comprised within a second channel quality report; and estimating a CQI drift in time, frequency, or both time and frequency based upon said determined first sub-band and said determined second sub-band.

14. A first communication node for determining a revised indication of channel quality of a radio channel between the first communication node and a second communication node, wherein the radio channel comprises a plurality of sub-bands, the first communication node comprising:

an obtaining unit configured to obtain at least two channel quality reports, each channel quality report corresponding to a different time instance, wherein each channel quality report includes indications of channel quality corresponding to each of at least two of the plurality of sub-bands;

an estimator configured to estimate a channel quality deviation for at least one of the plurality of sub-bands, based on channel quality indications included in at least two of the most recently obtained channel quality reports, said channel quality indications comprising indications corresponding to at least two sub-bands and at least two different time instances; and a determining unit configured to determine said revised indication of channel quality for at least one of the plurality of sub-bands based on the estimated channel quality deviation for at least one of the plurality of sub-bands.

15. The first communication node of claim 14, wherein the determining unit is further configured to schedule communication resources between the first communication node and the second communication node based on the revised indication of channel quality for at least one of the plurality of sub-bands.

16. The first communication node of claim 14, wherein the determining unit is further configured to adapt the communication on the radio channel between the first communication node and second communication node based on the revised indication of channel quality for at least one of the plurality of sub-bands.

17. The first communication node of claim 14, wherein the estimator is further configured to:

determine a first sub-band having a maximum value of its corresponding channel quality indication (CQI) from within the CQIs comprised within a first channel quality report;

determine a second sub-band having a maximum value of its corresponding CQI from within the CQIs comprised within a second channel quality report;

estimate a CQI drift in time, frequency, or both time and frequency based upon said determined first sub-band and said determined second sub-band; and estimate the channel quality deviation based upon the estimated CQI drift.

18. The first communication node of claim 14, wherein the estimator is further configured to:
    determine a minimum prediction error for at least one of the plurality of sub-bands, and
    compare the minimum prediction error with the obtained channel quality indication; and
    wherein the determining unit is configured to determine a revised indication of channel quality based on the minimum prediction error and the estimated channel quality deviation.

19. The first communication node of claim 14, wherein the estimator is further configured to determine a minimum prediction error for at least one of the plurality of sub-bands using candidate test functions.

20. The first communication node of claim 14, wherein the estimator is further configured to determine a minimum prediction error for at least one of the plurality of sub-bands using a statistical model, the statistical model being one of Maximum-likelihood estimation (MLE), mean-square-error (MSE), Minimum-distance estimation (MDE), and quasi-maximum-likelihood estimate (QMLE).

21. The first communication node of claim 14, wherein the estimator is further configured to:
    determine a first sub-band having a minimum value of its corresponding channel quality indication (CQI) from within the CQIs comprised within a first channel quality report;
    determine a second sub-band having a minimum value of its corresponding CQI from within the CQIs comprised within a second channel quality report;
    estimate a CQI drift in time, frequency, or both time and frequency based upon said determined first sub-band and said determined second sub-band; and
    estimate the channel quality deviation based upon the estimated CQI drift.

22. A method, in a second communication node, for estimating and transmitting a channel quality deviation of a radio channel between a first communication node and the second communication node, wherein the radio channel comprises a plurality of sub-bands, the method comprising:
    obtaining at least two channel quality reports, each channel quality report corresponding to a different time instance, wherein each channel quality report includes indications of channel quality corresponding to each of at least two of the plurality of sub-bands;
    estimating a channel quality deviation for at least one of the plurality of sub-bands, based on channel quality indications included in at least two of the most recently obtained channel quality reports, said channel quality indications comprising indications corresponding to at least two sub-bands and at least two different time instances; and
    transmitting the estimated channel quality deviation to the first communication node.

23. A second communication node for estimating and transmitting a channel quality deviation of a radio channel between a first communication node and the second communication node, wherein the radio channel comprises a plurality of sub-bands, the second communication node comprising:
    an obtaining unit configured to obtain at least two channel quality reports, each channel quality report corresponding to a different time instance, wherein each channel quality report includes indications of channel quality corresponding to each of at least two of the plurality of sub-bands;
    an estimator configured to estimate a channel quality deviation for at least one of the plurality of sub-bands, based on channel quality indications included in at least two of the most recently obtained channel quality reports, said channel quality indications comprising indications corresponding to at least two sub-bands and at least two different time instances; and
    a transmitting unit configured to transmit the estimated channel quality deviation to the first communication node.

* * * * *

UNITED STATES PATENT AND TRADEMARK OFFICE
CERTIFICATE OF CORRECTION

PATENT NO. : 9,088,999 B2  
APPLICATION NO. : 13/574161  
DATED : July 21, 2015  
INVENTOR(S) : Asplund et al.

Page 1 of 1

It is certified that error appears in the above-identified patent and that said Letters Patent is hereby corrected as shown below:

Claims

In Column 17, Line 3, in Claim 17, delete "Cols" and insert -- CQIs --, therefor.

In Column 17, Line 6, in Claim 17, delete "Cols" and insert -- CQIs --, therefor.

Signed and Sealed this
First Day of December, 2015

Michelle K. Lee
*Director of the United States Patent and Trademark Office*